United States Patent [19]  [11] 3,890,140
Asbury  [45] June 17, 1975

[54] ALUMINUM TITANATE CRUCIBLE FOR MOLTEN URANIUM

[75] Inventor: Joseph J. Asbury, Knoxville, Tenn.

[73] Assignee: The United States of America as represented by the United States Energy Research and Development Administration, Washington, D.C.

[22] Filed: May 10, 1973

[21] Appl. No.: 359,052

[52] U.S. Cl............ 75/84.1 R; 75/65 R; 106/38.27; 106/38.9; 106/73.33; 264/109; 264/125; 266/39
[51] Int. Cl............................................. C22b 61/04
[58] Field of Search ....... 75/226, 65, 84.1; 264/109, 264/125; 266/39; 106/62, 65, 73.33, 106/38.9, 38.27

[56] References Cited
UNITED STATES PATENTS

| 2,947,114 | 5/1957 | Hill | 266/39 X |
| 3,049,432 | 8/1962 | Weber | 266/39 X |
| 3,189,473 | 6/1965 | Weber | 266/39 X |
| 3,622,313 | 11/1971 | Havel | 75/226 |

OTHER PUBLICATIONS

Nuclear Science Abstract No. 26; 59158 [AEC Report Y-1831 9/1972].
AEC Report No. ANL-7391 10/1967.
AEC Report No. RFP-900 2/1968.

Primary Examiner—Benjamin R. Padgett
Assistant Examiner—R. E. Schafer
Attorney, Agent, or Firm—Dean E. Carlson; David S. Zachry; Earl L. Larcher

[57] ABSTRACT

This invention is directed to an improved crucible for molten uranium. The crucible or crucible liner is formed of aluminum titanate which essentially eliminates contamination of uranium and uranium alloys during molten states thereof.

4 Claims, No Drawings

ALUMINUM TITANATE CRUCIBLE FOR MOLTEN URANIUM

This invention was made in the course of, or under, a contract with the U.S. Atomic Energy Commission.

The present invention relates generally to a container for use in uranium metallurgical processes, and more particularly to a crucible or crucible liner of aluminum titanate for inhibiting contamination of molten uranium or uranium alloys.

The metallurgical processes involving uranium and uranium alloys are often required to melt the uranium such as in metal refining techniques, preparation of alloys and the formation of suitable ingots for subsequent fabrications. The melting or fusing of uranium is achieved at a temperature in the range of about 1,350° to 1,400°C. in crucibles of graphite, tungsten and other electrically conductive materials or in a nonconductive crucible such as formed of tantalum wherein arc melting procedures would be practiced. Inasmuch as these crucibles are of materials highly reactive with molten uranium they are coated or lined with a suitable ceramic such as magnesium zirconate, alumina, magnesia or zirconium. The ceramic crucibles have met with only partial success in that these crucibles or crucible liners have high coefficients of thermal expansion which make them particularly susceptible to thermal shock which may result in small fissures and cracks in the crucible. The presence of such a crack or fissure in a uranium melting operation permits diffusion of impurities from the underlying crucible holder into the uranium so as to contaminate the latter. This is particularly undesirable where the crucible is formed of graphite since the carbon oxides in the graphite are readily diffused into the molten uranium. Magnesia crucibles are somewhat satisfactory at temperatures below about 1,400° but above about 1,450°C. the molten uranium reduces the magnesia crucibles with a violent boiling of magnesium. Another shortcoming of the known crucibles and crucible liners is that molten uranium tends to wet the lining materials so as to cause the removal of the uranium from the crucible to be somewhat difficult. Such wetting and cracking of crucibles and crucible liners cause the liners to have a relatively short life in an uranium melting operation. Another shortcoming of previous ceramic crucibles and crucible liners is due to a reaction between the molten uranium or uranium alloy and the ceramic which contaminates the uranium or uranium alloy.

It is the primary aim or goal of the present invention to overcome the above and other shortcomings and drawbacks of the previously known crucibles and crucible liners employed in metallurgical processes involving molten uranium and uranium alloys. This goal is achieved by the method of melting uranium and uranium alloys in a crucible or crucible liner formed of aluminum titanate ($Al_2TiO_5$ or $Al_2O_3 \cdot TiO_2$). The crucible or crucible liner formed of $Al_2TiO_5$ is non-wetting and essentially non-reactive with respect to molten uranium and remains effectively intact during melting operations so as to inhibit the contamination of the molten uranium with materials in the crucible.

Other and further objects of the invention will be obvious upon an understanding of the illustrative method about to be described, or will be indicated in the appended claims, and various advantages not referred to herein will occur to one skilled in the art upon employment of the invention in practice.

Described generally, the crucibles of the present invention are formed of sinterable $Al_2TiO_5$. The crucibles may be employed alone or used as liners for conventional crucibles or crucible holders as known previously, such as those formed of graphite and other well-known materials. Alternatively, the present invention may be employed as a crucible liner in combination with a metal such as tungsten wherein the crucible liner is formed by pressing and sintering the $Al_2TiO_5$ powder. Tungsten powder is then placed about the outside of the crucible and cold- or hot-pressed into place so as to form a laminated structure with the entire outer surface of the $Al_2TiO_5$ liner being in contact with the tungsten receptacle.

The particular $Al_2TiO_5$ powder employed in the present invention is prepared in accordance with the teachings in assignee's copending application Ser. No. 288,228, filed Sept. 11, 1972, now U.S. Pat. No. 3,825,653, and entitled "Sinterable Aluminum Titanate Powder." The sinterable powder of $Al_2TiO_5$ as described in this application is provided by the steps of preparing solutions containing equimolar portions of an aluminum compound in the +3 ion or valent state and a titanium compound in the +4 ion or valent state, coprecipitating the aluminum and titanium as a hydroxide, collecting the precipitate, filtering and drying the precipitate and then calcining the resulting hydrated powder in air at a temperature of 700°–800°C. for a duration of 5–40 hours. The successful coprecipitation of the sinterable $Al_2TiO_5$ powder can be achieved by the synthesis of a 50—50 mole percent aluminum oxide - titanium oxide mix involving the hydrolysis of the metal alkoxides in a suitable hydrocarbon diluent. The aluminum and titanium alkoxides suitable for employment in this solution include isopropylates, ethylates, butylates and tert-amylates. The hydrocarbon diluents for the alkoxides include benzene, toluene, hexane and xylene. The powder and products formed from the $Al_2TiO_5$ powder prepared from equimolar portions of aluminum and titanium alkoxides in accordance with the teachings in assignee's copending application are characterized by an average linear coefficient of expansion of less than $1 \times 10^{-6}$ in/in°C. over a temperature range of about 25°–1000°C. Crucibles and crucible liners, which are preferably fabricated by isostatically pressing $Al_2TiO_5$ powders in a size range of 10 to 70 microns at a pressure in the range of 15,000 to 50,000 psi and a temperature in the range of 1,300° to 1,700°C. in an inert atmosphere such as argon, are particularly suitable for melting uranium of high purity. However, if desired, the crucibles may also be formed by employing a slip casting and sintering operation. Thin-walled (⅛ to 3/16 of an inch wall thickness) crucibles prepared by isostatically hot-pressing these powders have an average compressive strength of 5,000 psi and a density greater than 85 percent of theoretical (3.73 grams per cc). Since the uranium does not wet the $Al_2TiO_5$ surface so as to allow for the molten uranium to readily flow from the crucible the molten uranium is subjected to very slight contamination with the $Al_2TiO_5$ materials so as to essentially eliminate any contamination of the uranium during melting operations. The crucible or crucible liners of the present invention do not display the extent of brittleness normally associated with ceramics. The subject crucible liner can readily be used in an electrically conductive receptacle so as to form a strong, temperature-stable container for induction-heated uranium and uranium alloy melting operations.

The use and success of $Al_2TiO_5$ for the preparation of crucibles and crucible liners useful in uranium melting operations were not expected in view of the properties of aluminum oxide and titanium oxide. For example, aluminum oxide and titanium oxide each react with uranium at a relatively low temperature of 1,200°C. with the heat of reactions being −24 and −42 k cal for the aluminum oxide and titanium oxide, respectively. Further, the near zero expansion coefficient of the $Al_2TiO_5$ would appear to render the use of such a material undesirable for crucible fabrication since it has been a normal practice to match materials having closer thermal expansion coefficients so as to inhibit cracking and undesirable thermal stresses. The $Al_2TiO_5$ crucible and crucible liners are useful for melting uranium for refining purposes, forming ingots and preparing or melting commonly-known alloys such as identified in the publication *Uranium Metallurgy*, Vol. 2, "Uranium Corrosion and Alloys," by W. D. Wilkinson, 1962, John Wiley & Sons, N.Y.

In order to provide a more facile understanding of the present invention examples are set forth below relating to the preparation of $Al_2TiO_5$ crucibles and crucible liners.

EXAMPLE I

Aluminum titanate powder prepared as described above was isostatically pressed and sintered into a crucible. The crucible was about 1 inch in diameter and 1.75 inches in height with a nominal wall thickness of 0.2 inch. The powder was pressed and sintered in argon at a pressure of 30,000 psi and a temperature of 1,550°C. A uranium coupon weighing 8.2 grams was melted in the crucible at a temperature of 1,450°C. in an argon atmosphere. A spectrographic analysis indicated the melted uranium coupon contained 20 ppm aluminum and less than 4 ppm titanium as compared to a 5 ppm aluminum and 6 ppm titanium content in the uranium coupon prior to the melting operation.

EXAMPLE II

A crucible with an inner layer of aluminum titanate and an outer layer of tungsten was prepared for use in induction-heated, melting operations. First, the aluminum titanate layer was formed by isostatically pressing and sintering the powder in argon at 30,000 psi and 1,550°C. in an inert atmosphere. Tungsten metal powder was placed around the formed aluminate titanate layer, then isostatically pressed and sintered at 30,000 psi and 1,500°C. in an argon atmosphere. The tungsten and aluminum titanate crucible was subjected to a 1,500°C. temperature cycle for melting a coupon of uranium metal weighing about 7.5 grams. Spectrographic analysis of the coupon indicated the uranium contained 18 ppm aluminum and less than 4 ppm titanium after the melting operation as compared to 5 ppm of aluminum and 6 ppm of titanium prior to the melting operation.

It will be seen that the present invention affords a method of melting uranium and uranium alloys without suffering the attendant contamination and crucible wetting problems heretofore suffered.

What is claimed is:

1. A method of limiting adverse contamination of uranium and uranium alloys during molten states thereof by the step of melting the uranium alone or with uranium alloying metals in a crucible or crucible liner composed of aluminum titanate.

2. The method of claim 1, wherein the aluminum-titanate crucible or crucible liner is characterized by a wall thickness in the range of ⅛ to 3/16 of an inch, an average coefficient of thermal expansion of less than 1 × $10^{-6}$ over a temperature range of 25° to 1,000°C., and a density greater than 85 per cent theoretical.

3. The method of claim 2, wherein the aluminum-titanate crucible or crucible liner is prepared by hot-isostatically pressing aluminum-titanate powder of a size in the range of 10 to 70 microns at a pressure in the range of 15,000 to 50,000 pounds per square inch and a temperature in the range of 1,300° to 1,700°C.

4. A method for treating uranium and uranium alloys comprising the steps of contacting a crucible or crucible liner composed of aluminum titanate with a charge consisting of uranium alone or with uranium alloying metals, heating the charge to a temperature adequate to fuse the charge, and thereafter removing the fused charge from the crucible or crucible liner.

* * * * *